United States Patent
Umemoto

(10) Patent No.: US 6,531,853 B2
(45) Date of Patent: Mar. 11, 2003

(54) DC-DC CONVERTER

(75) Inventor: Kiyotaka Umemoto, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/988,471

(22) Filed: Nov. 20, 2001

(65) Prior Publication Data

US 2002/0060559 A1 May 23, 2002

(30) Foreign Application Priority Data

Nov. 21, 2000 (JP) .................................. 2000-354251

(51) Int. Cl.[7] ................................................. G05F 1/40
(52) U.S. Cl. ...................................................... 323/282
(58) Field of Search ................................. 323/282, 283, 323/284, 285, 351

(56) References Cited

U.S. PATENT DOCUMENTS

| | | | | |
|---|---|---|---|---|
| 5,747,976 A | * | 5/1998 | Wong et al. | 323/282 |
| 5,847,554 A | * | 12/1998 | Wilcox et al. | 323/285 |
| 6,100,677 A | * | 8/2000 | Farrenkopf | 323/282 |
| 6,304,066 B1 | * | 10/2001 | Wilcox et al. | 323/282 |
| 6,366,066 B1 | * | 4/2002 | Wilcox | 323/282 |
| RE37,738 E | * | 6/2002 | Brkovic | 323/222 |
| 6,456,050 B1 | * | 9/2002 | Agiman | 323/282 |

* cited by examiner

*Primary Examiner*—Adolf Deneke Berhane
(74) *Attorney, Agent, or Firm*—Mattingly, Stanger & Malur, P.C.

(57) ABSTRACT

A DC—DC converter supplied with a power from a DC power source having a predetermined power source voltage, for controlling an output voltage of the DC—DC converter such that the output voltage becomes an aimed output voltage, by switching a transistor with a pulse having a predetermined width when the output voltage is lower than the aimed output voltage and stopping the switching operation of the transistor when the output voltage exceeds the aimed output voltage, comprises a variable duty cycle pulse generator circuit for generating a pulse having duty cycle determined by a ratio of the power source voltage to the aimed output voltage, a switch circuit for outputting the pulse as a switching pulse of the transistor when the switch circuit is turned ON and a control circuit for turning the switch circuit ON when the output voltage is lower than the aimed outut voltage.

9 Claims, 2 Drawing Sheets

DC-DC CONVERTER

BACKGROUND OF THE INVENTION

1. Field of the Invention

The present invention relates to a DC—DC converter and, in particular, to a DC—DC converter, which utilizes a switching regulator inputted with and selectively driven by a voltage of a battery power source, a power source for obtaining DC power by rectifying AC power or an AC adapter and which has a wide dynamic range of an input voltage and can stabilize an output voltage thereof even when the power source voltage is varied. In the following description, the power source for generating DC power by rectifying AC power or the AC adapter will be referred to as "AC power source".

2. Description of the Prior Art

In a conventional portable electronic device such as a portable audio equipment, a personal computer, a PHS (Personal Handyphone System), a portable telephone set or a PDA (Personal Digital Assistance), etc., it has been usual to utilize a DC—DC converter constructed with a switching regulator for obtaining a predetermined power source voltage by efficiently performing a power conversion.

FIG. 2 shows a construction of an example of a conventional switching regulator used for the DC—DC converter.

In FIG. 2, the switching regulator 10 includes an error amplifier (Err) 11, a reference voltage generator circuit 12, a PWM pulse generator circuit 13, which includes a comparator 13a and a triangular wave generator circuit 13b, a driver 14, a switching circuit 15 constructed with a P channel MOSFET Q and a Schottky diode D connected in series with the P channel MOSFET Q. The series circuit of the P channel MOSFET Q and the Schottky diode D is provided between a power source line +Vcc connected to an input side DC power source and ground GND.

The switching regulator 10 further includes an output capacitor C provided between an output terminal 16 and ground GND and a solenoid L is connected between a junction of the MOSFET Q and the Schottky diode D and the output terminal 16. In this case, a value of the solenoid L is in the order of 10 $\mu$H and a capacitance of the output capacitor C is about 150 $\mu$F, for example. The switching regulator 10 further includes a resistive voltage divider circuit 17 constructed with a series connection of resistors R1 and R2, which are provided between the output terminal 16 and ground GND. A detection voltage Vs detected by the resistive voltage divider circuit 17 is fedback to the error amplifier 11. The detection voltage Vs is compared by the error amplifier 11 with a reference voltage Vref generated by the reference voltage generator circuit 12 and a resultant voltage difference Ve (error detection signal) is inputted to the comparator 13a of the PWM pulse generator circuit 13.

The resistive voltage divider circuit 17 for generating the output voltage is constructed with the series circuit of the resistors R1 and R2 and a speed-up circuit for reducing a time period from an operation start time of the DC—DC converter 10 up to a time at which the DC—DC converter 10 becomes in a steady operation state. The speed-up circuit comprises a CR time constant circuit 17a, which is a series circuit of a resistor and a capacitor and is connected in parallel to the resistive voltage divider circuit 17 and functions to set a PWM driving gain.

The error amplifier (Err) 11 includes a phase correction circuit 18 composed of a series circuit of a capacitor C1 and a resistor R3 and a capacitor C2 connected in parallel to the series circuit of the capacitor C1 and the resistor R3. The phase correction circuit 18 is connected between one of input terminals of the error amplifier 11 and an output terminal thereof and constructs a negative feedback circuit functioning to prevent oscillation of the error amplifier 11 when the PWM drive gain is increased.

The comparator 13a of the PWM pulse generator circuit 13 compares a triangular wave signal generated by the triangular wave generator circuit 13b with the error voltage Ve to slice the tooth wave by the error voltage to thereby generate a PWM pulse signal, which is supplied to the driver 14. The driver 14 ON/OFF controls the transistor Q according to a width of the PWM pulse and generates a reduced voltage at the output terminal 16 when the DC—DC converter 10 is of a drop type. When the DC—DC converter is of a boost type, a boosted voltage, which is generated by a fly-back pulse, appears at the output terminal 16.

Incidentally, the Schottky diode D is a flywheel diode for returning a current, which flows out from the solenoid L when the transistor Q is turned OFF, to the solenoid L.

As described, the transistor Q of the DC—DC converter 10 is ON/OFF controlled such that the voltage Vs divided by the resistive voltage divider circuit 17 becomes coincident with the reference voltage Vref to make the output voltage at the output terminal 16 coincident with the constant voltage Vo to thereby stabilize the output voltage.

The input side power source line +Vcc, whose voltage Vcc is equal to Vin, is usually connected to a battery as shown by a dotted line. In a portable, notebook type personal computer, etc., however, one of a battery power source and an AC power source is selected by means of a power source switching circuit and utilized as the input side power source.

In a PWM control circuit for performing such operation, a range of the input power source voltage Vin is limited and its dynamic range is relatively narrow. The reason for this is that, in order to stabilize the output voltage when the input power source voltage is lowered, the PM control is performed such that a ratio of the ON period of an output transistor of the driver 14 to the OFF period thereof is set to, for example, 80% or more, so that a variation range of the pulse width with respect to a variation of the error voltage Ve is restricted and saturated. Therefore, it becomes difficult to satisfactorily perform a control operation with respect to a variation of the output voltage when the power source voltage is lowered. On the other hand, in the portable, notebook type personal computer, etc., in which one of the battery power source and the AC power source is selectively utilized as the input side power source by the power source switching circuit, the input power source voltage when the AC power source is used is usually higher than that of the battery. Therefore, when the AC power source is used, the variation of the power source voltage is larger than that when the battery is used, so that it becomes necessary to regulate the power source voltage in a wider range. Further, when the power source voltage is increased, the PWM control is performed in a level of the triangular wave in the vicinity of a summit thereof, contrarily to the case mentioned above. Therefore, it becomes difficult to perform a satisfactory control with respect to a variation of the output voltage when the power source voltage is lowered, similarly to the case mentioned above.

In order to obtain a stable output voltage under the circumstances, it is preferable that the PWM control is performed for the input power source voltage Vin in a level in which duty cycle is in a range from 30% to 70%.

As a control system capable of obtaining some dynamic range with respect to the input power source voltage Vin, there is the current mode PWM control system in which the PWM control is performed by current comparison. However, since, in such system, a detection resistor is inserted in series with a switching transistor Q, power loss is increased and a current comparator circuit, etc., are required additionally, so that there are problems of high cost and low power conversion efficiency.

On the other hand, in the conventional portable electronic device such as a notebook type personal computer, the output power source voltage is lowered in a standby state or a sleep mode thereof. On the contrary, in a case where luminance of a liquid crystal display thereof is set high, it is necessary to generate high output voltage. In such portable electronic device, it is necessary to give a wider dynamic range for the input power source voltage. However, the conventional DC—DC converter mentioned previously can not sufficiently deal with such requirements.

SUMMARY OF THE INVENTION

An object of the present invention is to provide a DC—DC converter, which is capable of making dynamic range of an input voltage wide and can stabilize an output voltage thereof even when a power source voltage is varied.

In order to achieve the above object, a DC—DC converter according to the present invention, which receives a predetermined power source voltage and controls an output voltage thereof such that the output voltage becomes equal to an aimed output voltage by switching an output transistor with a pulse having a predetermined width when the output voltage is lower than the aimed output voltage and stopping the switching operation of the output transistor when the output voltage exceeds the aimed voltage, is featured by comprising a variable duty cycle pulse generator circuit for generating a pulse having duty cycle, which is determined by a ratio of the power source voltage to the aimed output voltage, a switch circuit for outputting the pulse as a switching pulse of the output transistor when the output transistor is turned ON by the pulse and a control circuit for controlling the switch circuit to turn ON when the output voltage is lower than the aimed output voltage.

It is usual that, in the drop type DC—DC converter, which utilizes a switching regulator employing the PWM control system, the switching operation is controlled by a pulse having duty cycle, which is determined by a ratio of (input power source voltage)/(aimed output voltage to be stabilized). Therefore, in the present invention, the pulse having duty cycle corresponding to the ratio of the input power source voltage to the aimed output voltage is generated and the output transistor is switched by this pulse. In this case, the duty cycle is set to a value, which is in the vicinity of a center value thereof, that is, about 50%, in a voltage stabilizing control state when the input power source voltage Vin is a predetermined regular voltage. The output voltage is stabilized by performing the switching control of the output transistor with using the pulse having this duty cycle when the output voltage is lower than the aimed output voltage and stopping the switching operation of the transistor when the output voltage exceeds the aimed output voltage, without performing the PWM control.

In the present invention, the PWM control is performed by the variable duty cycle pulse generator circuit to deal with a variation of the input power source voltage Vin. That is, the PWM control is not used for the stabilizing control of the output voltage. When the input power source voltage is risen or lowered from the predetermined regular voltage, the PWM control is performed by the variable duty cycle pulse generator circuit correspondingly to the variation of the input power source voltage. That is, the PWM control is performed by reducing the duty cycle of the pulse when the input power source voltage is risen from the predetermined voltage or increasing the duty cycle when the input power source voltage is lowered. Therefore, the control range of the duty cycle can be changed from the center value thereof, which is 50%, so that it is possible to make the dynamic range of the DC—DC converter larger.

According to such control operation, even if an input power source voltage is supplied externally with which the duty cycle of the pulse is reduced from 50% to, for example, 25% or increased from 50% to 75%, it is possible to stabilize the output voltage by performing or stopping the switching control with using the duty cycle as the center value. Therefore, when the input power source is switched from the battery to the AC power source in, for example, a notebook type personal computer, it is possible to satisfactorily perform the output voltage stabilizing control.

Since, in the present invention, the pulse having duty cycle corresponding to a difference between the input power source voltage and the aimed output voltage is generated, it is possible to generate a pulse having duty cycle corresponding to the input voltage in the wide range and drive the switching transistor thereby. Further, since the duty cycle of the pulse is changed correspondingly to the input power source voltage, it is possible to control the input power source voltage with high traceability to a reduction thereof without using the PWM control and the variation range of duty cycle can be restricted to a small value.

As a result, it becomes possible to easily realize a DC—DC converter in which a wide dynamic range of the input voltage can be obtained and the output voltage thereof can be stabilized even when the power source voltage is varied.

DETAILED DESCRIPTION OF THE PREFERRED EMBODIMENTS

Figure 1:
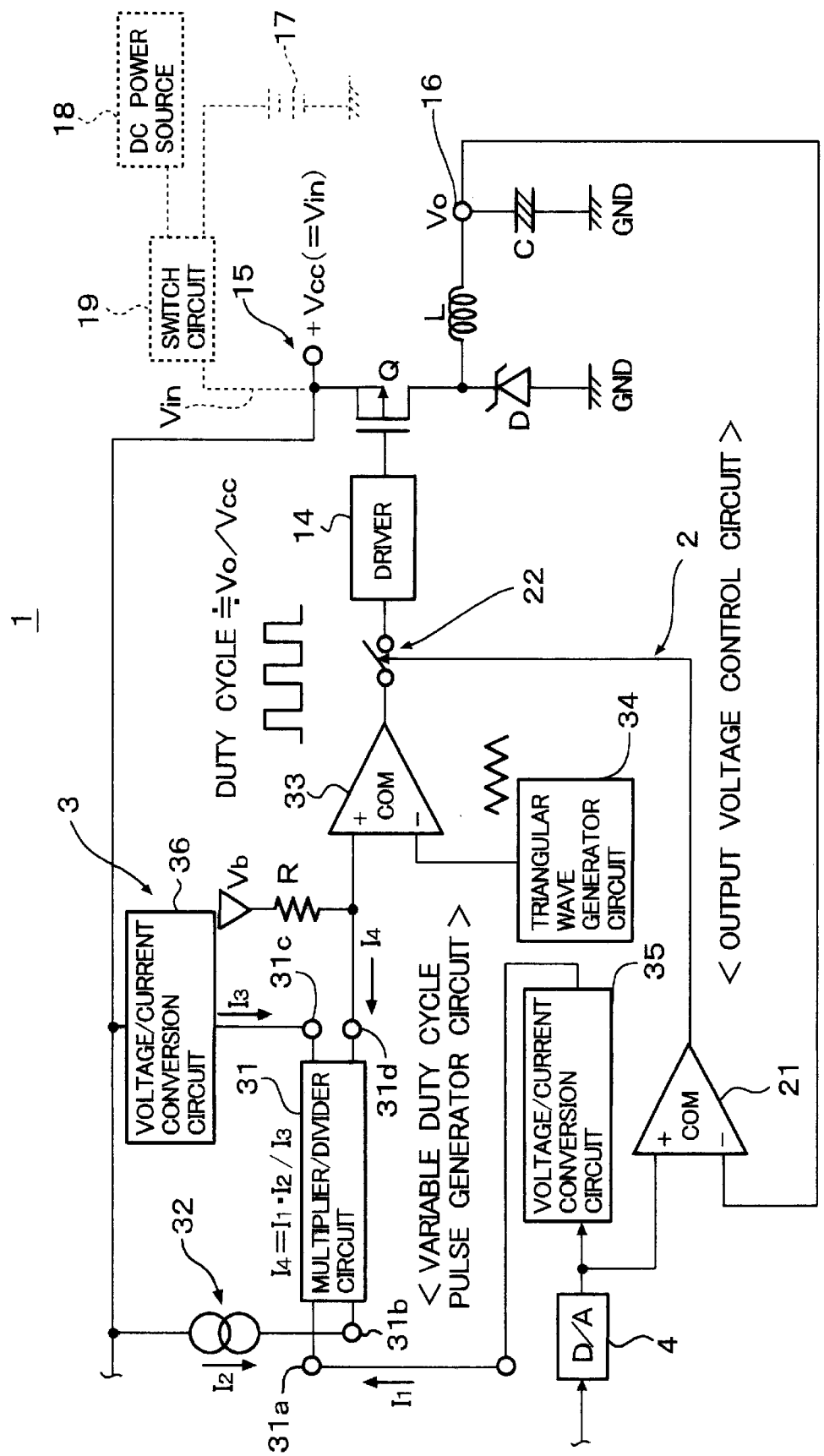
FIG. 1 is a block diagram of a DC—DC converter according to an embodiment of the present invention.

FIG. 1 is a block diagram of a DC—DC converter according to an embodiment of the present invention. In FIG. 1, same constructive components as those shown in FIG. 2 are depicted by same reference numerals, respectively, with descriptions thereof being omitted for avoidance of duplication.

Figure 2:
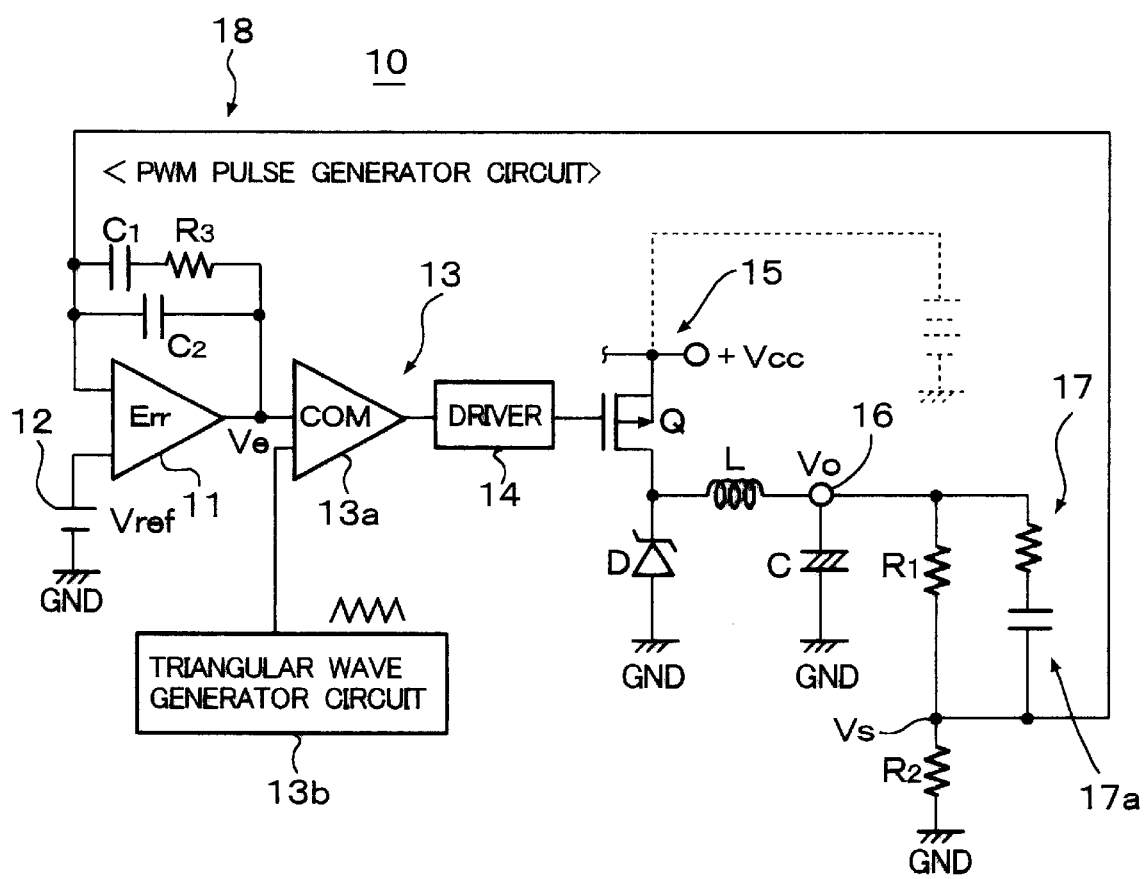
FIG. 2 is a schematic block diagram of an example of a conventional voltage drop type DC—DC converter using a switching regulator.

In the DC—DC converter 1 shown in FIG. 1, an output voltage control circuit 2 and a power source voltage dependent, variable duty cycle pulse generator circuit 3 for determining duty cycle correspondingly to a ratio of a power source line voltage Vcc (=input power source voltage Vin) to an aimed output voltage (=output voltage Vo), that is, Vo/Vcc, are provided in lieu of the error amplifier 11 and the PWM pulse generator circuit 13 of the DC—DC converter 10 shown in FIG. 2. Further, in lieu of the reference voltage generator circuit 12 of the DC—DC converter 10 shown in FIG. 2, the present DC—DC converter 1 includes a D/A converter 4, which converts an external digital value setting signal into an analog signal for setting a reference voltage, which corresponds to the aimed output voltage. The digital value setting signal is supplied from a controller of such as a micro computer (not shown).

The output voltage control circuit 2 is constructed with a comparator 21 and a switch circuit 22 and outputs an output pulse of the variable duty cycle pulse generator circuit 3 to a driver 14 through the switch circuit 22.

The comparator 21 compares the analog voltage (=the aimed output voltage Vo) outputted from the D/A converter 4 with the output voltage at the output terminal 16 and maintains the switch circuit 22 in ON state when the output voltage at the output terminal 16 is lower than the aimed output voltage Vo. Therefore, when the switch circuit 22 is in the ON state, a transistor Q of the switching circuit 15 is driven by a pulse, which is generated by the variable duty cycle pulse generator circuit 3 and has duty cycle corresponding to Vo/Vcc.

When the output voltage at the output terminal 16 is higher than the converted voltage from the D/A converter 4, the switch circuit 22 is in OFF state (stop state), so that the switching control of the transistor Q is not performed.

As a result, the output voltage at the output terminal 16 is stabilized to a voltage corresponding to the analog voltage (=the aimed output voltage Vo) of the D/A converter 4.

In the following description, the present invention will be described under assumption that the output voltage at the output terminal 16 equal to the aimed output voltage Vo.

The variable duty cycle pulse generator circuit 3 is constructed with a multiplier/divider circuit 31, a current discharging constant current circuit 32, a resistor R, a comparator 33, a triangular wave generator circuit 34, a voltage/current converter circuit 35 for converting the analog voltage from the D/A converter 4 into a current value and a voltage/current converter circuit 36 for converting the input power source voltage Vin (=Vcc) into a current value corresponding thereto and functions to generate a pulse having duty cycle corresponding to Vo/Vcc at an output terminal of the comparator 33.

The multiplier/divider circuit 31 takes in the form of an IC operation circuit constructed with a plurality of paired transistors. The D/A converter 4 outputs the analog voltage value to the voltage/current conversion circuit 35 and the voltage/current conversion circuit 35 converts the analog voltage into a constant current value I1, which is supplied to an input terminal 31a of the multiplier/divider circuit 31. An input terminal 31b of the multiplier/divider circuit 31 is supplied with a constant discharge current I2 from the constant current circuit 32. An input terminal 31c of the multiplier/divider circuit 31 is connected to an output terminal of the voltage/current conversion circuit 36 and supplied with a current I3, which corresponds to the power source voltage Vcc, from the voltage/current conversion circuit 36. The voltage/current conversion circuit 36 is connected to the power source line +Vcc and converts the power source voltage Vcc into the current I3, which is supplied to the input terminal 31c of the multiplier/divider circuit 31. An input terminal 31d of the multiplier/divider circuit 31 is connected to a bias line through the resistor R and constitutes an output terminal functioning as current sink. Further, the input terminal 31d is connected to the (+) input of the comparator 33.

A voltage Vb of the bias line corresponds to an upper limit of an amplitude of the triangular wave generated by the triangular wave generator circuit 34. Assuming that a current I4 is supplied from the bias line through the resistor R to the input terminal 31d, the multiplier/divider circuit 31 performs an arithmetic operation such that the current I4 becomes I4=I1·I2/I3. Thus, the voltage inputted to the (+) input terminal of the comparator 33 is given by I4·R, where R is a resistance value of the resistor R.

The constant current I1 corresponds to the output voltage of the D/A converter 4. Since the output voltage Vo is controlled such that it becomes coincident with the output voltage of the D/A converter 4 through the comparing operation of the comparator 21 of the output voltage control circuit 2, the constant current I1 corresponds to the output voltage Vo. On the other hand, the duty cycle of the pulse, which results from the comparison performed by the comparator 33 of the triangular wave generator circuit 3, is determined by the current I4, which is determined by a ratio of the current I1 to the current I3. As a result, the duty cycle of the output pulse of the variable duty cycle pulse generator circuit 3 is determined correspondingly to Vo/Vcc.

When the input power source voltage Vin is supplied from a battery 17 as shown by a dotted line and is a predetermined regular voltage of the battery, the duty cycle of the output pulse of the variable duty cycle pulse generator circuit 3 is set to a value, which is in the vicinity of the center value of 50% under the voltage stabilizing control. This duty cycle can be selectively set according to the current I1 or the resistance R of the resistor R even when Vo and Vcc (=Vin) are determined. This pulse having duty cycle set to about 50% is obtained at the output terminal of the comparator 33. The output voltage Vo at the output terminal 16 is stabilized by ON/OFF controlling the switch circuit 22 according to the output signal of the comparator 21 such that the switching transistor Q is switched through the driver 14 according to the above mentioned duty cycle of the pulse when the switch circuit 22 is in the ON state and the switching operation of the transistor Q is stopped when the switch circuit 22 is in the OFF state.

Assuming that the DC power source 18, which includes a rectifier circuit for obtaining DC power by rectifying AC power, is selected by a switch circuit 19, the input power source voltage Vin may be substantially changed. In such case, the output voltage Vo at the output terminal 16 is stabilized by ON/OFF control of the switch circuit 22 according to the output signal of the comparator 21 to perform the switching control and the switching stop control of the switching transistor Q with the duty cycle being 40% or 65% corresponding to the duty cycle when the power source voltage Vin supplied from the external DC power source 18 becomes a value with which the duty cycle is changed from 50% to, for example, 40% or from 50% to 65%.

In this manner, it is possible to drive the switching transistor by the pulse having an appropriate duty cycle corresponding to the voltage Vcc (=Vin) of either the DC power source 18 or the battery 17 on the power source line +Vcc and the externally set output voltage Vo (=aimed output voltage).

As mentioned previously, the bias voltage Vb corresponds to the upper limit voltage value of the triangular wave generated by the triangular wave generator circuit 34. Therefore, when the input power source voltage Vcc (=Vin) is high and the output voltage at the output terminal 16 is specifically lower than the input power source voltage Vcc, the output current I4 of the multiplier/divider circuit 31 becomes substantially zero and the input voltage of the comparator 33 becomes equal to the upper limit voltage of the triangular wave, so that there is no output pulse generated by the comparator 33. On the contrary, when the input power source voltage Vcc (=Vin) is low and the output voltage at the output terminal 16 is specifically higher and close to the input power source voltage Vcc, the output current I4 of the multiplier/divider circuit 31 becomes large and the input voltage of the comparator 33 becomes close to the lower limit voltage of the triangular wave, so that the duty cycle of the output pulse generated by the comparator 33 becomes substantially 90% or more.

In a normal specification of the DC-DC converter, when the voltage Vcc is high, the output voltage Vo is high and, when the voltage Vcc is low, the output voltage Vo is low. Therefore, when the value of the resistor R is appropriately selected, it is possible to vary the comparison input voltage inputted to the (+) input terminal of the comparator 33 about a voltage value in the vicinity of the center voltage of the triangular wave. Consequently, even when the voltage Vcc of the selected power source is varied, the duty cycle of the driving pulse is not changed substantially and the switching transistor Q is driven by the pulse in an efficient range.

In addition, it is possible to obtain a large dynamic range due to the existence of the multiplier/divider circuit 31. Further, since the duty cycle of the driving pulse is changed in a rate correspondingly to the variation of the voltage Vcc (=Vin), the tracing characteristics of the DC-DC converter with respect to the voltage variation is improved and a stabilized output voltage is provided even when the power source voltage is dropped.

As described hereinbefore, the comparator 21 of the output voltage control circuit 2 directly compares the output voltage Vo with the output voltage of the D/A converter 4. Alternatively, it is possible to divide the output voltage Vo by a resistive voltage divider circuit such as the series circuit of the resistors R1 and R2 shown in FIG. 2 to obtain a predetermined proportion thereof as a detection voltage and compare the detection voltage with a corresponding proportion of the output voltage (aimed output voltage=output voltage) of the D/A converter 4.

In the latter case, since the output voltage of the D/A converter 4 is a constant proportion with respect to the output voltage Vo, the operation to be performed by the multiplier/divider circuit 31 becomes a problem. However, this problem can be solved by changing the value of the resistor R connected to the input terminal of the comparator 33 for current-to-voltage conversion or an operating value of the multiplier/divider circuit 31 correspondingly to the above mentioned predetermined ratio.

In this embodiment, the aimed output voltage is converted into a current value and the current is supplied to the multiplier/divider circuit. Alternatively, it is possible to generate the current I1 on the basis of the output voltage value of the D/A converter 4 and the current is directly inputted to the multiplier/divider circuit. Similarly, it is possible to directly connect the power source line +Vcc to the multiplier/divider circuit to directly input the current I3 to the multiplier/divider circuit. Further, although the current corresponding to Vo/Vcc is generated by the multiplier/divider circuit, a circuit for generating a voltage corresponding to Vo/Vcc may be used in lieu of the multiplier/divider circuit.

Further, the comparator 21 may generate a signal for turning the switch circuit 22 OFF when the output voltage at the terminal 16 exceeds the aimed voltage Vo.

What is claimed is:

1. A DC—DC converter supplied with a power from a DC power source having a predetermined power source voltage, for controlling an output voltage of said DC—DC converter such that the output voltage becomes an aimed output voltage, by switching a transistor with a pulse having a predetermined width when the output voltage is lower than the aimed output voltage and stopping the switching operation of said transistor when the output voltage exceeds the aimed output voltage, comprising:

a variable duty cycle pulse generator circuit for generating a pulse having duty cycle determined by a ratio of the power source voltage to the aimed output voltage;

a switch circuit for outputting the pulse as a switching pulse of said transistor when said switch circuit is turned ON; and a control circuit for turning said switch circuit ON when the output voltage is lower than the aimed output voltage.

2. A DC—DC converter as claimed in claim 1, wherein said variable duty cycle pulse generator circuit comprises a multiplier/divider circuit supplied with a first current value corresponding to the power source voltage, a second current value corresponding to the aimed output voltage and a predetermined constant current value, for generating an output current value by multiplying the second current value with the predetermined constant current value and dividing the multiplied value by the first current value, a first current/voltage converter circuit for converting the output current value into a voltage value and a first comparator for generating the pulse by comparing an output voltage value of said first current/voltage converter circuit with a voltage value of a triangular wave.

3. A DC—DC converter as claimed in claim 2, further comprising a second voltage/current converter circuit for converting the power source voltage into the first current value and a third voltage/current converter circuit for converting the aimed output voltage into the second current value, wherein said DC power source is either a battery or a power source for generating DC power by rectifying AC power, said first current/voltage converter circuit is a resistor connected between a predetermined bias line and one of input terminals of said first comparator.

4. A DC—DC converter as claimed in claim 3, further comprising a D/A converter circuit for converting an externally set data into the aimed output voltage and a triangular wave generator circuit for generating the triangular wave.

5. A DC—DC converter as claimed in claim 4, wherein a power supply line of said DC power source is a line to which one of said battery and said power source for generating DC power by rectifying AC power is selectively connected and the power source voltage is supplied from the power source line.

6. A DC—DC converter as claimed in claim 4, further comprising a second comparator for comparing the output voltage of said D/A converter circuit with the output voltage and generating a signal for turning said switch circuit ON.

7. A DC—DC converter as claimed in claim 4, further comprising a second comparator for comparing the output voltage of said D/A converter circuit with the output voltage and generating a signal for turning said switch circuit OFF when the output voltage exceeds the aimed voltage.

8. A DC—DC converter as claimed in claim 6, further comprising a constant current source for generating a predetermined constant current and a driver circuit, wherein said transistor is provided between said power source line of said DC power source and ground and said driver circuit is responsive to the pulse from said first comparator through said switch circuit to switch said transistor.

9. A DC—DC converter as claimed in claim 8, further comprising a smoothing circuit, wherein said second comparator compares the output voltage of said D/A converter circuit with a predetermined detection voltage tracing the output voltage and the output of said transistor is outputted from an output terminal of said DC—DC converter through said smoothing circuit as a power having the output voltage.

* * * * *